United States Patent [19]
Feiring

[11] 3,891,183
[45] June 24, 1975

[54] SEALING AND SEAT ASSEMBLY FOR BALL VALVE CONSTRUCTION
[75] Inventor: Monroe J. Feiring, West Warwick, R.I.
[73] Assignee: Gulf & Western Manufacturing Company, Southfield, Mich.
[22] Filed: Jan. 10, 1974
[21] Appl. No.: 432,419

[52] U.S. Cl. ............... 251/315; 251/174; 251/180
[51] Int. Cl. ......................................... F16k 25/00
[58] Field of Search .......... 251/315, 160, 174, 172, 251/180, DIG. 1; 285/DIG. 19; 277/123, 125

[56] References Cited
UNITED STATES PATENTS

| | | | |
|---|---|---|---|
| 2,929,606 | 3/1960 | Kaiser | 251/356 X |
| 3,047,265 | 7/1962 | Kaiser | 251/174 X |
| 3,097,823 | 7/1963 | Kaiser | 251/315 X |
| 3,114,386 | 12/1963 | Dumm | 251/315 X |
| 3,151,837 | 10/1964 | Bentley-Leek | 251/174 X |
| 3,346,234 | 10/1967 | Allen | 251/174 |
| 3,384,337 | 5/1968 | Brown | 251/315 X |
| 3,508,738 | 4/1970 | Atkinson | 251/315 |
| 3,565,392 | 2/1971 | Bryant | 251/315 X |
| 3,767,215 | 10/1973 | Brown | 277/125 |

Primary Examiner—Charles J. Myhre
Assistant Examiner—Ira S. Lazarus
Attorney, Agent, or Firm—Salter & Michaelson

[57] ABSTRACT

A sealing and seat assembly for use in a trunnion-type ball valve construction and including a plurality of sealing rings for sealing the assembly against the housing in which the ball valve construction is mounted, spring means in said assembly urging the sealing rings into positive engagement with the housing, and a sealing lip being formed on the assembly and engaging the ball valve, thereby forming a positive seal for the valve seat.

10 Claims, 4 Drawing Figures

PATENTED JUN 24 1975　3,891,183

SEALING AND SEAT ASSEMBLY FOR BALL VALVE CONSTRUCTION

BACKGROUND OF THE INVENTION

The present invention relates to a trunniontype ball valve construction and particularly to the seat and sealing assembly located in the inlet passage thereof.

Prior to the instant invention one of the problems experienced in trunnion-type ball valve constructions was the sealing of the inlet passage thereof that communicated with the central chamber in which the ball valve was located. Various types of sealing assemblies have been proposed and incorporated in the prior known ball valve constructions, but such sealing assemblies did not maintain a positive seal when subjected to large pressure and/or temperature variations, and further included a relatively large number of parts that prohibitively increased the cost of the valve construction.

Another problem experienced heretofore in sealing assemblies of ball valve constructions was the requirement for positive sealing of the ball valve against the seat located in the inlet passage and adjacent to the central chamber in which the ball valve was located. Under high pressures and/or temperatures, the prior known seats had a tendency to leak; and this was particularly apparent when the seat was subjected to fluctuating pressures and/or temperatures. Although some attempts have been made to provide for the adequate sealing of the valve seat when subjected to a variety of pressure and/or temperature differentials, such prior known constructions have also been prohibitive in cost.

SUMMARY OF THE INVENTION

The present invention relates to a trunnion-type ball valve construction having a ball valve located in a central chamber that is formed in the housing of the unit. The improvement as provided in the present invention is directed to a seat and sealing assembly designed for use in either the inlet or outlet passage of the ball valve construction and includes sealing members that are subjected to pressure of a spring and to the fluid directed through either the inlet or outlet passage for effecting a positive seal with the housing and further providing a positive seat for the ball valve. The seat and sealing assembly as embodied in the present invention includes a forward member having a seat formed thereon for receiving the ball valve in sealing engagement thereagainst, sealing rings being mounted on the forward member for sealing the forward member against the housing. An intermediate member engages the rearmost of the sealing rings and spring means engages the intermediate member for axially urging the intermediate member into firm engagement with the sealing rings, wherein the sealing rings seals the sealing assembly against the housing. A rear member abuts the spring means and locates the spring means in intimate contact with the intermediate member so that positive axial pressure is exerted thereagainst.

Accordingly, it is an object of the invention to provide a trunnion-type ball valve construction having a seat and sealing assembly that is relatively inexpensive and that may be easily installed and disassembled.

Another object of the invention is to provide a seat and sealing assembly for use in a ball valve construction that includes cooperating members, one of which receives a plurality of sealing rings that are subject to axial pressure for effectively sealing the inlet passage of the ball valve construction against the housing thereof.

Still another object is to provide a seat and sealing assembly for use in a ball valve construction having a sealing lip that is engageable with the ball valve for effectively sealing the ball valve when it is moved into sealing engagement therewith.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
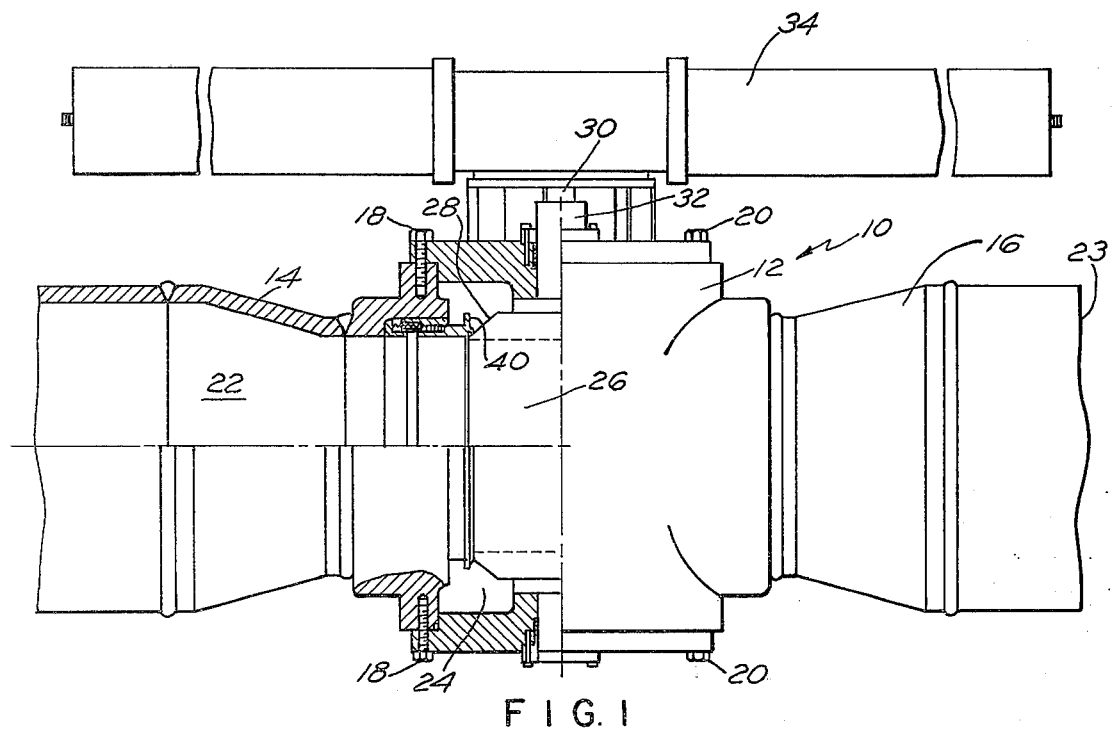
FIG. 1 is a side elevational view with parts shown in section of a trunnion-type ball valve construction embodied in the present invention.

Referring now to the drawing and particularly to FIG. 1, a trunnion-type ball valve construction as embodied in the present invention is generally indicated at 10 and includes a housing represented by a central portion 12 to which an inlet portion 14 and a discharge portion 16 are joined. Bolts 18 and 20, which engage the central portion 12, act to mount the bonnet of the unit thereon. A fluid inlet passage 22 is formed in the inlet portion 14 while a fluid discharge passage 23 is formed in the discharge portion 16. The fluid inlet and discharge passages 22 and 23 communicate with a central chamber 24 that is located in the central portion 12 of the ball valve housing. As illustrated in FIG. 1, the inlet portion 14 and discharge portion 16 of the housing are formed with several sections of varying diameters that are joined by welding; although, it is understood that the sections of the fluid inlet and discharge portions may be formed in any manner that is required for a particular valve construction. In certain instances it is also contemplated to interchange the function of the inlet and discharge passages, wherein the discharge passage would be used as the inlet passage and vice versa; and in this connection, the sealing assembly to be described would be utilized on both sides of the ball valve 26.

A ball valve 26 of conventional trunnion bearing construction is located in the central chamber 24 for rotation therein and includes a seating surface 28 that is engageable with a sealing and seat assembly as will hereinafter be described. Since the ball valve 26 is mounted for rotation, it is formed with a stem 30 that projects through a bonnet 32 of the housing and is interconnected to an actuating device 34. The actuating device 34 is movable to rotate the ball valve 26 to a valve closed or nonflowing position or to a valve open or flowing position as required.

Figure 2:
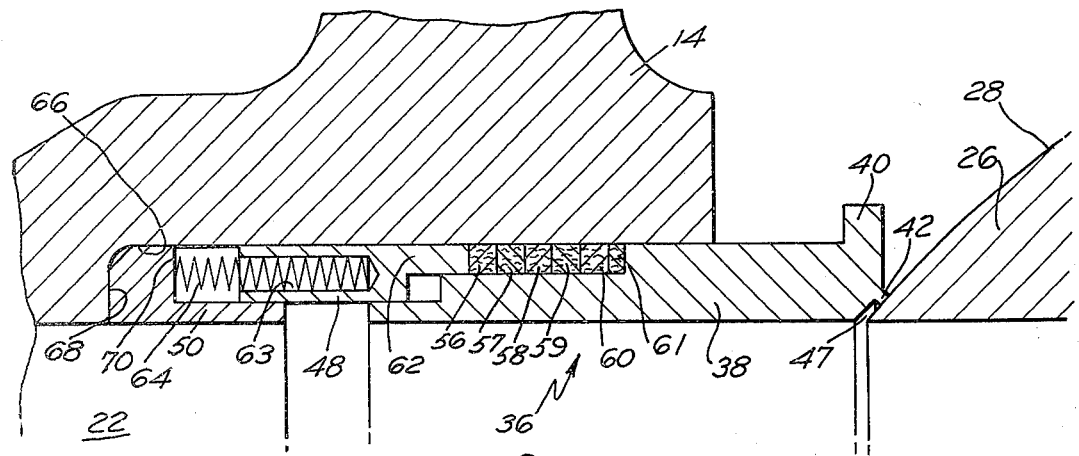
FIG. 2 is an enlarged fragmentary sectional view of the seat and sealing assembly incorporated in the ball valve construction illustrated in FIG. 1.
Figure 3:
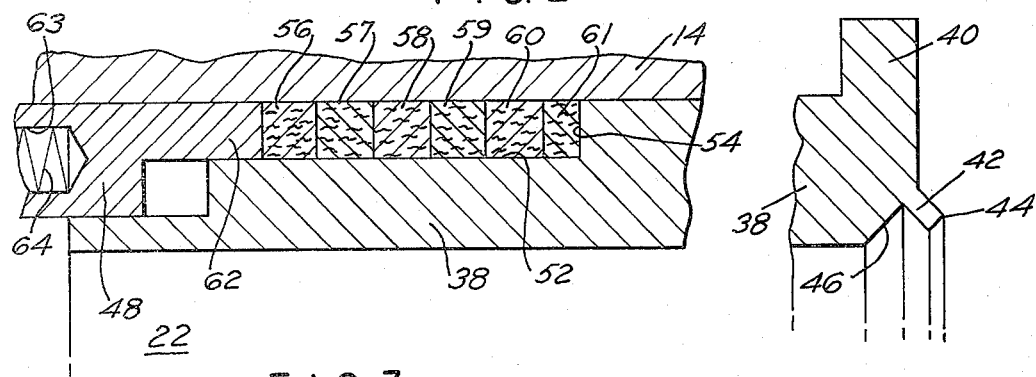
FIG. 3 is an enlarged fragmentary sectional view of the sealing rings that are incorporated in the seat and sealing assembly of the present invention.
Figure 4:
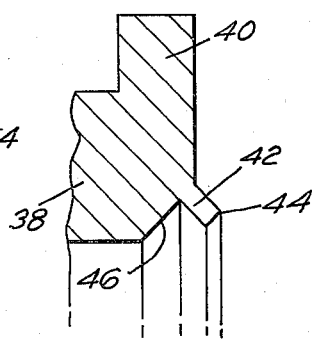
FIG. 4 is a fragmentary sectional view of the seat and sealing assembly illustrating the formation of the sealing lip thereon.

Referring now to FIGS. 2, 3 and 4, the seat and sealing assembly embodied in the present invention is generally indicated at 36, and as illustrated is located in the fluid inlet passage 22. As will be described, the seat and sealing assembly 36 is movable in an axial direction with respect to the fluid passage 22 for engagement with the seating surface 28 of the ball valve 26 for sealing communication between the fluid inlet passage 22 and the central chamber 24. As shown particularly in FIG. 2, the seat and sealing assembly 36 includes a forward member 38 on which a forward flange 40 is formed that is located adjacent to the ball valve 26, and is normally positioned within the central chamber 24. Located opposite to the flange 40 on the innermost edge of the forward member 38 is a sealing lip 42 that has an outer edge 44, the surface of which is generally inclined with respect to the longitudinal axis of the fluid inlet passage 22. The surface 44 of the sealing lip 42 is also lapped to properly seal against the adjacent surface of the ball valve 26 and thereby engages with this surface in face-to-face contact, the forward member 38 and the sealing lip 42 being somewhat flexible, wherein the sealing lip 42 conforms to the surface of the ball valve 26 when engaged thereby. The sealing lip 42 may be welded to the forward member 38 or may be inlaid, added or inserted in some manner thereon. For this purpose the sealing lip 42 may be formed of a metal or plastic material and if formed of a metal may also be fused or brazed to the forward member 38. It is also contemplated that the forward member 38 include the sealing lip 42 as an integral part thereof; although the flexible lip 42 may be attached to the forward member 38 by a fastener or the like. However in this instance care would have to be taken to prevent loosening of the fastener upon engagement of the sealing lip 42 by the ball valve 26, since effective sealing of the ball valve 26 against the lip 42 and the adjacent seat would then be difficult to achieve.

In order to provide sufficient flexibility for the sealing lip 42, the length of the lip may be of a greater dimension than the width thereof. This relationship can vary according to the pressure exerted thereon by the fluid passing through the fluid inlet passage 22, a relatively low pressure in the fluid inlet passage 22 dictating a longer and thinner lip, whereas high pressure in the fluid inlet passage would specify a wider dimension for the lip. Since the sealing lip 42 defines a sealing area, it has been found that reducing the outer edge or surface 44 provides for a higher unit loading pressure and thereby improves the seal between the lip 42 and the ball valve 26. The corners of the lip may also be diamond honed to prevent chatter upon engagement thereof with the ball valve 26. As will be described, the sealing lip 42 is maintained in sealing engagement by the inherent strength thereof and also by the force of the fluid that is present in the fluid inlet passage 22. Thus, the fluid exerts a pressure against the underside and end of the forward member 38 and acts to urge and to retain the sealing lip 42 in the sealing position thereof; and it is seen that the pressure of the fluid in the fluid inlet passage 22 also tends to deflect the forward member 38 and sealing lip 42 radially. The amount of pressure exerted on the sealing lip 42 to urge it into sealing engagement with the ball valve 26 is a function of the difference between the outside diameter of forward member 38 and the mean seat diameter of the lip 42. In this connection a gap 47 formed between the sealing lip 42 and the passage 22 influences the amount of pressure exerted on the sealing lip 42 and also prevents erosion of the sealing lip by the fluid passing through the valve.

The seat and sealing assembly 36 as shown in FIGS. 2 and 3 further includes an intermediate member 48 and a rear member 50, the forward axially movable member 38, intermediate member 48 and rear member 50 all cooperating to effectively seal the inlet passage 22 and to further provide for sealing of the ball valve 26 in the closed position thereof. The forward member 38 of the sealing and seat assembly has a reduced portion formed adjacent to the rear thereof as defined by a notch 52 which forms a shoulder 54. Located in the notch 52 are a plurality of sealing rings indicated at 56, 57, 58, 60 and 61, the endmost ring 61 abutting the shoulder 54 and having a somewhat greater outer diameter than the outer rings, which causes the ring 61 to normally project slightly above the other rings. Upon compression of the rings by the springs, the ring 61 is squeezed against the end of the notch 52 and the adjacent inner surface of the inlet portion 14, wherein the density of the ring is increased to render it somewhat harder than the other rings. The ring 61 thereby engages the end of the notch 52 and the adjacent inner surface of the inlet portion 14 in positive sealing relation. The sealings 56–61 as illustrated are of a nonmetallic material, but it is contemplated that they be formed of any suitable metallic material as required. The sealing rings are also shown being formed in a conventional flat configuration, but it is also contemplated that they be formed in a chevron configuration.

The sealing rings 56–61 are normally loaded under compression by the intermediate member 48 which has an annular projecting portion 62 that engages the ring 56, which is the innermost of the sealing rings. The projecting portion 62 is slidably received in the notch 52 of the forward member 38 for engagement with the endmost ring 56 of the sealing rings. Formed in the rear surface of the intermediate member 48 are a plurality of spaced bores or openings 63 in which compression springs 64 are located. As illustrated in FIG. 2, the seat and sealing assembly as defined by the forward member 38, intermediate member 48 and rear member 50 are all positioned in an annular cutout portion 66, formed in the housing portion 14, the inner diameters of the seat and sealing members conforming to the diameter of the fluid inlet passage 22. A shoulder 68 is located at the rear end of the cutout portion 66, and the rear member 50 abuts the shoulder 68 and defines a stop for the seat and sealing assembly. An interior shoulder 70 defined by an annular cutout portion formed in the rear member 50 receives the compression springs 64 thereagainst and also defines a stop therefor, wherein the compression springs 64 are urged into the bores or openings 62 of the intermediate member 48 for firm contact with the intermediate member 48.

It is seen that the compression springs 64 urge the intermediate member 48 forwardly to compress the sealing rings 56–61 for sealing the assembly against the housing. Further, the compression springs 64 urge the forward member 38 in an axial direction toward the ball valve 26 so that sufficient contact of the sealing lip 42 is made therewith when the ball valve 26 is moved to the closed position for sealing the fluid inlet passage 22 from the central chamber 24. Thus the pressure of the springs 64 provides initial static or preloading of the sealing lip 42 against the ball valve, the pressure of the fluid entering the inlet passage 22 adding a further sealing force to the sealing lip. The seat and sealing assembly also defines an effective seal of the valve body in the open or closed position of the valve. If the valve is a single direction unit, that is, flow of fluid moves in one direction only, then the seat and sealing assembly would be installed on one side of the valve as described herein. However, in those instances where flow of fluid is bi-directional, the seat and sealing assembly would be installed on both sides of the valve, the function of both units being substantially as described herein.

In use of the device, the ball valve 26 is moved to a closed position by an actuating means 34 for sealing the fluid inlet passage 22 from the central chamber 24 upon engagement of the surface of the ball valve 26 with the sealing lip 42. The positive urging of the intermediate member 48 against the sealing rings 56–61 produces sealing contact of the sealing rings with the adjacent surface of the housing and effectively seals the fluid inlet passage 22 from the interior of the valve construction. It is seen that the lip 42 may be elastically deformed upon sealing engagement with the ball valve 26 without being plastically deformed to alter the shape thereof. The telescoping arrangement of the intermediate member 48 with the forward member 38 and rear member 50 has the added advantage of enabling the assembly to be easily installed and maintained. Broken springs are prevented from entering the fluid system by this arrangement and similarly any foreign matter in the fluid system cannot become lodged in the springs. The springs also provide for easy retraction of the assembly for installation or removal of the ball valve. The sealing and seat assembly as embodied in the present invention is unique in that it is not affected by any stresses that are applied by the system to the piping or housing, and thus it is seen that the function of the sealing and seat assembly is not related to any physical changes in the valve body.

Normally, the elements of the seat and sealing assembly 36 are assembled in the position of use in the valve body cavity. However, it is contemplated that the elements be preassembled into a complete unit prior to the insertion into the valve body cavity. This would serve to prevent the accidental loss of loose springs or other parts into the system piping during the assembly procedure.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A trunnion-type ball valve construction, comprising a housing, fluid inlet and discharge passages formed in said housing, a central chamber formed in said housing and normally communicating with said fluid inlet and discharge passages, a ball valve rotatably located in said central chamber for sealing communication between said inlet passage and central chamber, means for rotating said ball valve, said inlet passage having a notch formed therein that defines a rear shoulder, and a seat and sealing assembly located in said notch in said fluid inlet passage for receiving said ball valve in sealing engagement and sealing the fluid inlet passage against leakage into said housing, said seat and sealing assembly including a forward member having a seat formed thereon for receiving said ball valve in sealing engagement thereagainst, a rear member axially spaced from said forward member and firmly engaging said shoulder formed in said notch in said fluid inlet passage, a plurality of sealing rings mounted on said forward member in coaxial, parallel relation for sealing said forward member against said housing, an intermediate member bridging the space between said forward and rear members and engaging said sealing rings, a plurality of springs interposed between said rear and intermediate members for urging said intermediate member into firm engagement with said sealing rings, wherein said sealing rings seal said seat and sealing assembly against said housing.

2. A trunnion-type ball valve construction as claimed in claim 1, said forward member having a rear portion formed with a reduced diameter with respect to the forward portion thereof to define a notch, said sealing rings being received in the notch formed in said forward member.

3. A trunnion-type ball valve construction as claimed in claim 2, the junction of the reduced diameter rear portion and forward portion of said forward member defining a shoulder, the forwardmost of said sealing rings engaging said shoulder and having an outer diameter slightly greater than the outer diameter of the other sealing rings for producing a harder bearing surface for bearing against said shoulder and for promoting effective sealing against said housing.

4. A trunnion-type ball valve construction, as claimed in claim 1, the seat formed on said forward member including a sealing lip that extends outwardly of said seat for engagement with said ball valve.

5. A trunnion-type ball valve construction as claimed in claim 4, the length of said sealing lip being greater in dimension than the width thereof, wherein flexibility of said sealing lip is provided so that it deforms when engaged by said ball valve to be effectively sealed thereagainst.

6. A trunnion-type ball valve construction as claimed in claim 4, said flexible sealing lip being formed of a metallic material.

7. A trunnion-type ball valve construction as claimed in claim 6, the outermost edge of said sealing lip being inclined with respect to the longitudinal axis of said inlet passage and generally conforming to the surface of the ball valve with which it engages.

8. A trunnion-type ball valve construction as claimed in claim 1, said intermediate member having a plurality of openings formed in the rear portion thereof, each of said springs being received in an opening in said intermediate member, said springs urging said forward member and seat formed thereon in an axial direction for engagement of the seat with said ball valve.

9. A trunnion-type ball valve construction as claimed in claim 8, said rear member having an annular shoulder formed thereon against which the rearmost ends of said springs abut, wherein said springs are maintained under compression in said openings to urge said intermediate member into intimate engaging relation with said sealing means.

10. A trunnion-type ball valve construction as set forth in claim 1, said sealing rings being formed of a nonmetallic material and mounted on said forward member in face-to-face relation, wherein the outer peripheral edges of said sealing rings engage the housing located adjacent thereto, the forward of said sealing rings having an outer diameter of greater dimension than that of the remaining sealing rings, the larger sealing ring being of a harder material than the remaining rings and affording greater interference with the portion of the housing in engagement therewith, thereby providing an effective seal thereagainst.

* * * * *